(12) United States Patent
Sistu

(10) Patent No.: US 9,703,888 B2
(45) Date of Patent: Jul. 11, 2017

(54) COMPONENT OBSOLESCENCE REGISTRY

(71) Applicant: Dassault Systemes Enovia Corp., Waltham, MA (US)

(72) Inventor: Sreedhar Sistu, Acton, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 165 days.

(21) Appl. No.: 14/132,417

(22) Filed: Dec. 18, 2013

(65) Prior Publication Data

US 2015/0169782 A1 Jun. 18, 2015

(51) Int. Cl.
G06F 17/30 (2006.01)
G06Q 10/06 (2012.01)
G06Q 50/00 (2012.01)

(52) U.S. Cl.
CPC .. G06F 17/30893 (2013.01); G06F 17/30867 (2013.01); G06Q 10/06 (2013.01); G06Q 50/01 (2013.01)

(58) Field of Classification Search
CPC ........ G06F 17/30893; G06F 17/30867; G06Q 10/06; G06Q 50/01
USPC .......................................................... 707/708
See application file for complete search history.

(56) References Cited

U.S. PATENT DOCUMENTS

| | | | | |
|---|---|---|---|---|
| 6,032,175 A * | 2/2000 | Fletcher | ............ | H04L 29/12009 709/200 |
| 6,105,033 A * | 8/2000 | Levine | ................ | G06F 12/0813 |
| 6,925,447 B2 | 8/2005 | McMenimen et al. | | |
| 7,392,255 B1 * | 6/2008 | Sholtis | .............. | G06F 17/30566 |
| 7,548,802 B2 | 6/2009 | Avery et al. | | |
| 7,672,921 B1 * | 3/2010 | Clay | ...................... | G06Q 10/06 706/12 |
| 7,702,636 B1 * | 4/2010 | Sholtis | .............. | G06F 17/30566 707/999.1 |
| 9,047,315 B1 * | 6/2015 | Gildfind | .............. | G06F 17/3087 |
| 9,361,368 B1 * | 6/2016 | Patel | ...................... | G06Q 50/01 |
| 2002/0030689 A1 * | 3/2002 | Eichel | ...................... | G06T 11/60 345/588 |
| 2002/0147659 A1 * | 10/2002 | Hong | ...................... | G06Q 30/02 705/26.35 |

(Continued)

FOREIGN PATENT DOCUMENTS

EP 1 569 148 A2 8/2005
WO WO2013/131134 A2 * 9/2013 ............. G06Q 90/00

OTHER PUBLICATIONS

Meyer et al., "A Management Approach to Component Obsolescence in the Military Electronic Support Environment", SA Journal of Industrial Engineering 2003, vol. 14, No. 2, pp. 121-136, 2003.*

(Continued)

*Primary Examiner* — Phuong Thao Cao
(74) *Attorney, Agent, or Firm* — Hamilton, Brook, Smith & Reynolds, P.C.

(57) ABSTRACT

An electronic obsolescence registry holds network user-searchable obsolescence information. End users and component manufacturers can post obsolescence information using hashtags to it. The registry has different entries for different pieces of component obsolescence information. Each entry employs a respective component specific hashtag. End-users search the registry for component obsolescence information relating to a certain component by using one or more hashtags associated with the certain component.

18 Claims, 4 Drawing Sheets

(56) References Cited

U.S. PATENT DOCUMENTS

| | | | |
|---|---|---|---|
| 2003/0023519 A1* | 1/2003 | Zulpa | G06Q 10/06 705/29 |
| 2003/0084143 A1* | 5/2003 | Knoesel | G06F 17/3089 709/224 |
| 2003/0126005 A1 | 7/2003 | Liao et al. | |
| 2003/0196094 A1* | 10/2003 | Hillis | G06F 21/64 713/179 |
| 2003/0208397 A1* | 11/2003 | VanDusen | G06Q 10/06 705/14.27 |
| 2005/0004837 A1* | 1/2005 | Sweeney | G06Q 30/02 705/14.16 |
| 2005/0086188 A1* | 4/2005 | Hillis | G06N 5/022 706/50 |
| 2005/0102269 A1* | 5/2005 | Lamping | G06F 17/30595 |
| 2005/0187744 A1 | 8/2005 | Morrison et al. | |
| 2005/0190894 A1* | 9/2005 | Fukunaga | H04M 3/533 379/88.13 |
| 2005/0222700 A1* | 10/2005 | Itano | G06Q 10/00 700/106 |
| 2006/0095925 A1* | 5/2006 | Roth | G06F 9/44505 719/331 |
| 2006/0136873 A1* | 6/2006 | Herter | G06F 8/20 717/114 |
| 2007/0033167 A1* | 2/2007 | Basu | G06F 17/30864 |
| 2007/0038664 A1* | 2/2007 | Jonas | G06F 17/30592 |
| 2007/0112976 A1* | 5/2007 | Anders | H04L 12/4625 709/246 |
| 2007/0171835 A1* | 7/2007 | Gobara | H04L 29/12509 370/248 |
| 2007/0282879 A1* | 12/2007 | Degenkolb | G06F 17/30864 |
| 2008/0005080 A1* | 1/2008 | Xiques | G06Q 10/10 |
| 2008/0103845 A1* | 5/2008 | Owens | G06Q 10/00 705/7.36 |
| 2008/0294610 A1* | 11/2008 | Strosaker | G06F 17/30731 |
| 2009/0024675 A1* | 1/2009 | Hewitt | G06F 21/606 |
| 2010/0174709 A1 | 7/2010 | Hansen et al. | |
| 2010/0250497 A1* | 9/2010 | Redlich | F41H 13/00 707/661 |
| 2011/0145231 A1* | 6/2011 | Ronen | G06Q 30/08 707/728 |
| 2011/0295873 A1* | 12/2011 | Potter | G06F 19/321 707/769 |
| 2012/0265806 A1* | 10/2012 | Blanchflower | G06Q 10/10 709/204 |
| 2012/0290610 A1* | 11/2012 | Hoang | G06Q 10/10 707/769 |
| 2013/0046826 A1* | 2/2013 | Stanton | G06Q 10/10 709/204 |
| 2013/0060598 A1 | 3/2013 | Dudley et al. | |
| 2013/0117151 A1* | 5/2013 | Macaisa | G06Q 50/01 705/26.8 |
| 2013/0138673 A1* | 5/2013 | Uemura | G06F 17/30038 707/758 |
| 2013/0144864 A1 | 6/2013 | Noble et al. | |
| 2013/0144891 A1* | 6/2013 | Nagasaka | G06F 17/30634 707/749 |
| 2013/0151308 A1* | 6/2013 | Helms | G06Q 10/087 705/7.29 |
| 2013/0179763 A1* | 7/2013 | Starzan | H04N 21/2743 715/205 |
| 2013/0254231 A1* | 9/2013 | Decker | G06F 17/30864 707/770 |
| 2013/0262592 A1* | 10/2013 | DeLuca | G06Q 10/107 709/206 |
| 2013/0283137 A1* | 10/2013 | Wu | G06F 17/30876 715/205 |
| 2013/0290337 A1* | 10/2013 | Lansford | G06F 17/30598 707/738 |
| 2013/0294443 A1* | 11/2013 | Kahn | H04L 65/1073 370/352 |
| 2013/0304454 A1 | 11/2013 | Kimberly et al. | |
| 2013/0317907 A1* | 11/2013 | Duan | G06Q 30/02 705/14.53 |
| 2013/0332162 A1* | 12/2013 | Keen | G10L 15/26 704/235 |
| 2014/0101194 A1* | 4/2014 | Arians | G06F 17/30867 707/769 |
| 2014/0157149 A1* | 6/2014 | Nishizawa | H04N 21/4788 715/752 |
| 2014/0164365 A1* | 6/2014 | Graham | G06Q 50/01 707/723 |
| 2014/0193136 A1* | 7/2014 | Nishizawa | G11B 27/034 386/248 |
| 2014/0222908 A1* | 8/2014 | Park | G06Q 50/01 709/204 |
| 2014/0244819 A1* | 8/2014 | Patrick | H04L 41/0806 709/223 |
| 2014/0250192 A1* | 9/2014 | Djin | H04L 12/1859 709/206 |
| 2014/0304622 A1* | 10/2014 | Jorasch | H04L 12/1813 715/753 |
| 2014/0330732 A1* | 11/2014 | Grignon | G06Q 50/01 705/319 |
| 2015/0106446 A1* | 4/2015 | Brophy | H04L 67/12 709/204 |
| 2015/0112848 A1* | 4/2015 | Co | G06Q 40/04 705/37 |
| 2015/0128168 A1* | 5/2015 | Itamoto | H04H 60/37 725/32 |
| 2015/0142429 A1* | 5/2015 | Ondeck | G10L 19/00 704/231 |
| 2015/0143405 A1* | 5/2015 | Hogan | H04N 21/8146 725/32 |
| 2015/0149539 A1* | 5/2015 | Shukla | H04L 67/22 709/204 |
| 2015/0150147 A1* | 5/2015 | Keohane | G06F 21/6209 726/28 |
| 2015/0169782 A1* | 6/2015 | Sistu | G06F 17/30893 707/708 |
| 2015/0288680 A1* | 10/2015 | Leggette | G06F 21/6218 726/6 |

OTHER PUBLICATIONS

A search result from SearchAll.com, 3 pages, accessed online at <https://www.searchall.com/search/> on Mar. 29, 2017.*

Geremew et al., "Using Scalable and Secure Web Technologies to Design a Global Digital Format Registry Prototype: Architecture, Implementation, and Testing", Archiving 2006. Final Program and Proceedings: 5 pages, Society for Imaging Science and Technology, 2006.*

Heidorn, M., "Finding the Right Parts—Fast", Printed Circuit Design & Manufacture, pp. 33-34 and 37, Dec. 2003.*

European Search Report, Application No. 14196384.3, "Component Obsolescence Registry", mailing date May 4, 2015.

* cited by examiner

COMPONENT OBSOLESCENCE REGISTRY

FIELD OF THE INVENTION

Embodiments assist with product design by ensuring that correct components are chosen at design time. The disclosed is also helpful in inventory management by ensuring inventory strategies take into account the obsolescence status of components.

BACKGROUND OF THE INVENTION

Global computer networks, such as the Internet, have provided new computing platforms and applications (including, software application design). For example, internet scale distributed computing provides so-called network as platform computing. The network as platform allows applications (configured as web-enabled applications), to be run entirely through a browser. Further, the network as platform allows users across or within various roles to collaborate.

With respect to a given web-enabled application, a user/client (a distributed object architecture client) executes the application through a respective browser. The browser is in communication with an application server (the distributed object server). Additionally, the browser is in communication with a web server. Many services, such as authentication services, transaction services, naming services, administration services and security services are duplicated on both the application server and the web server. Each user/client is typically separately registered with the platform. And each user/client is responsible for implementing a respective set of Web server services.

An industry example of computer implemented programs and collaborative systems using network as platform is Product Lifecycle Management (PLM) Systems. PLM solutions refer to a business strategy that helps companies to share product data, apply common processes, and leverage corporate knowledge for the development of products from conception to the end of their life, across the concept of extended enterprise. According to this concept, a company is made up not just of its company departments but also of other actors such as business partners, suppliers, Original Equipment Manufacturers (OEM), and customers. By including these actors, PLM may allow this network to operate as a single entity to conceptualize, design, build, and support products and processes.

Amongst the PLM solutions are the computer-aided techniques, which are known to include Computer-Aided Design (CAD). Computer-Aided Design relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations. Some PLM solutions make it possible, for instance, to design and develop products by creating digital mockups (a 3D graphical model of a product). The digital product may be first defined and simulated using an appropriate application. Then, the lean digital manufacturing processes may be defined and modeled.

For example, generally, known PLM solutions provide means for organizing product engineering knowledge, managing manufacturing engineering knowledge, and enabling enterprise integrations and connections into both the engineering and manufacturing knowledge centers. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

PLM information, including product configuration, process knowledge and resources information are typically intended to be edited in a collaborative way. For instance, a team of designers working in a collaborative way may individually contribute to design a product by accessing shared information related to the product from remote sites through web-enabled applications. Each user or remote site is separately registered with the system platform and each is responsible for implementing a respective set of web-server services for the application(s) of this project. Although a user may have existing web services originally implemented for other applications, there is no mechanism to reuse or share these web services for the current project. There is a need for users at a client or applications of the platform to copy or otherwise leverage off existing web services.

At present, component obsolescence information is very fragmented with few authoritative sources. Several component distributors keep track of this information but this only contributes to further fragmentation. There has been some work done by RosettaNet to standardize this information flow, but its adoption is somewhat low.

Current solutions to communicate obsolescence information rely on intermediaries. Users of components who need obsolescence information have to resort to multiple sources to obtain this information. Component manufacturers would like to communicate the information on obsolescence but there lacks a standardized unbiased and reliable registry to submit this information to.

SUMMARY OF THE INVENTION

Embodiments of the present invention allow component manufacturers as well as users of the components to post obsolescence information to a central registry using hashtags. For a given component, analysis of several posts with same or similar hashtags will allow the registry to predict the obsolescence status of the component. This is akin to crowd-sourcing the information. Optionally a manufacturer can claim a hashtag thus maintaining ownership of that respective hashtag. This will provide a manufacturer with a channel to communicate obsolescence information to several customers at once (simultaneously or together).

At the outset this invention offers a simple mechanism—short internet post with a hashtag. This will likely enable more users to post obsolescence information given the simplicity. Secondly this does not restrict the ability to post information only to certain users thus broadening the scope and consequently the value of the information.

Embodiments of the present invention take the form of computer methods, systems, apparatus and computer program products. Each embodiment provides an electronic obsolescence registry for holding component obsolescence information. The registry has different entries for different pieces of the component obsolescence information. The different entries in the registry employ respective component specific hashtags for the corresponding subject components.

Embodiments enable an end-user to search the registry for component obsolescence information relating to a certain component using one or more hashtags.

Some embodiments provide the electronic obsolescence registry online in a global computer network. Providing the electronic obsolescence registry online may include providing access to the registry through a social network site or similar structure. In such embodiments, the different entries are different posts by various (one or more) members of the social network.

In accordance with one aspect, the different registry entries include messages and comments about one or more of the messages. Embodiments provide means enabling different users to create the different entries (messages and comments) in the registry. Embodiments provide means enabling an end-user to subscribe to automatically receive component obsolescence information as respective entries are created in the registry (i.e., as other users create and add entries to the registry).

In accordance with another aspect, embodiments further enable a certain entity to maintain a respective component-specific hashtag.

In some embodiments, the component specific hashtag utilizes or is otherwise formed of a component identifier, a component part number or similar industry recognizable component reference.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Embodiments of the present invention help product design by ensuring that right components are chosen at the time of product design. This is also helpful in inventory management by ensuring inventory strategies take into account the obsolescence status of components.

A central registry is provided by embodiments. The central registry accepts notifications from manufacturers on potential obsolescence. This can reduce the burden on manufacturers to broadcast obsolescence notifications in more than one manner and can use a simple mechanism such as a hashtag to post information.

Manufacturers register or claim a component (or resellers can register or claim a component on a manufacturer's behalf) to legitimize the information. Alternatively, this process may be crowdsourced, which would have less authenticity but would still be useful.

The key idea is to use a simple mechanism to tag and broadcast obsolescence information to interested parties and to enable interested parties to detect/receive obsolescence information and easily process it.

Accordingly, embodiments include:

a) a user interface that provides a feed of obsolete components, b) a user interface that allows users to submit obsolescence information via hashtags, and c) usage of part numbers as hashtags.

A "hashtag," as used herein, generally refers to a word or phrase that includes a hash symbol (#) prefix. The word or phrase acts as an index for use in finding information related to, for example, a designated component. Non-limiting examples of hashtag usage is provided below. However, it should be understood that the embodiments described herein are not limited to hashtags and may instead use any suitable index to group data and/or locate data.

Figure 1:
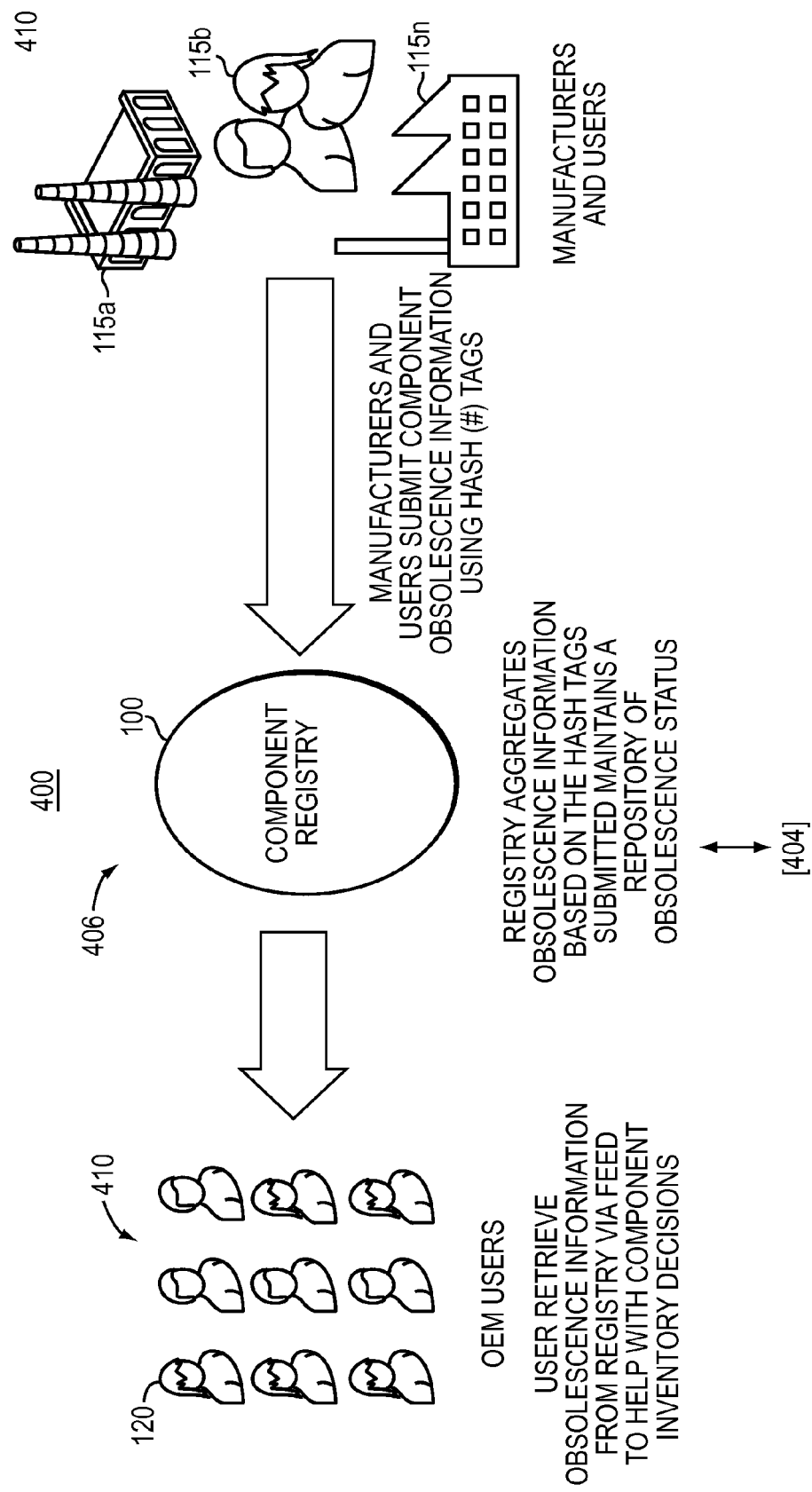
FIG. 1 is a schematic illustration of principles of the present invention.
Figure 2:
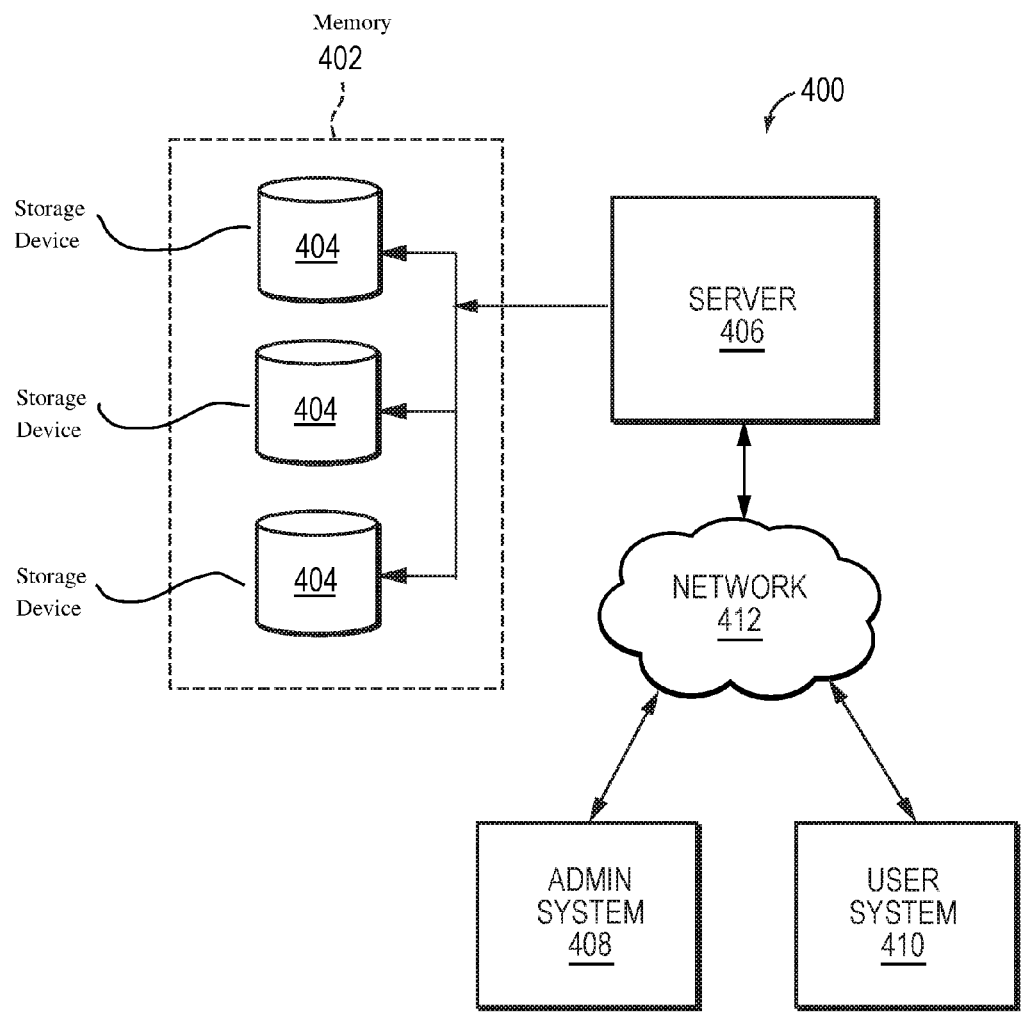
FIG. 2 is a schematic view of a computer network and obsolescence registry system embodying the present invention.

Illustrated in FIGS. 1 and 2 is a non-limiting example embodiment (obsolescence registry system 400) of the present invention. The obsolescence registry system 400 is formed of a server 406 and supporting database 404. The server 406 hosts an Information Sharing and Communication site 100 in a global computer network (for example the Internet) 412. The Information Sharing and Communication site 100 is structured as a social networking or equivalent forum. For instance, the Information Sharing and Communication site 100 enables users (members) through client computer 410 to:

post information (text and/or images) in the form of searchable messages that are date-time stamped, organize groupings of posted messages (also referred to as "posts"), such as by subject matter, topic or other categories, search for posted messages by topic/category, and add individual user comments (also referred to as "posts") to posted information (including comments commenting on a message, and comments commenting on another comment).

The database 404 stores and maintains the posted information (i.e., messages and comments) and supporting metadata (e.g., categories, date-timestamps, author, hashtag metadata as detailed further below, etc.) such that the various screen views of the Information Sharing and Communication site 100 can be displayed to clients/users. In this way, the Information Sharing and Communication site 100 provides a venue and associated mechanism for the ongoing exchange of information. In particular, the Information Sharing and Communication site 100 provides for the ongoing exchange of component obsolescence information, and to that extent the Information Sharing and Communication site 100 is a component registry 100.

A user registers with the Information Sharing and Communication site/component registry 100 to become a member of the hosted special-purpose social network/forum/venue. In particular, an entity (for example original equipment manufacturer or OEM, component manufacturer, reseller, organization, etc.) registers as a commercial (non-individual) user or as an individual user. In the example of FIG. 1, users 115*a, b, . . . n* are each such registered members of the Information Sharing and Communication site/component registry 100.

The Information Sharing and Communication site/registry 100 provides a hashtag mechanism for member-users 115*a, b, . . . n* to post product (or parts) obsolescence information on the site/registry 100. In one embodiment, the hashtag mechanism uses the format:

ABC . . . X where the hash symbol is of common hashtag technology, and

ABC . . . X is the member-users specified designation for the associated obsolescence information. For example, ABC . . . X may be a part number or other component identifier. System 400 follows common hashtag protocol and treats ABC . . . X as a metadata tag or hypertext link to the associated obsolescence information. System 400 stores ABC . . . X in database 404 as metadata to the associated posted obsolescence information. The #ABC . . . X serves as an index to the various posts (messages, original message, and subsequent comments) that use that hashtag. The hashtag may be positioned at the beginning, middle or end of the message or comment content.

OEMs, product designers, and other reader-users 120 of site/registry 100 search and retrieve obsolescence information from registry 100 using respective hashtags to index the specific component obsolescence information. The reader-users 120 access site/registry 100 via client computers 410. Further reader-users 120 may subscribe to site/registry 100, such that system 400 forwards to these subscription users newly posted obsolescence information as posting users 115 create new posts in registry 100. For example, during the registration process, an end-user registers as a subscriber to obsolescence information relating to a certain (specific individual) component, a subset of components and/or all components in registry 100. Known subscription technology is utilized to implement these features.

As a result product designers can ensure that the correct and proper components are chosen at design time having read the pertinent obsolescence information from registry 100. Inventory managers may also take into account obsolescence status of components in their inventory strategies using component obsolescence information from registry 100. Reader-users 120 can analyze several posts with the same or similar hashtags in registry 100 to predict obsolescent status of respective components.

In the member-user registration process, a manufacturer 115 (for example) may "claim" a certain hashtag and thus maintain ownership of that hashtag. This provides a level of consistency and certainty for obsolescence information posted with that hashtag. Otherwise other users 115 may post obsolescence information for the same component but using slightly varying hashtags. For a given component, reader users 120 and/or system 400 may analyze several posts with the same or similar hashtags in registry 100 to predict obsolescent status of the component.

Continuing with FIG. 2, shown is a schematic block diagram of an exemplary system 400 for use in providing a component obsolescence Registry 100, such as described above and/or additional processes that may be related to those described above. In an exemplary embodiment, a memory area 402 includes one or more storage devices 404 for use in storing registry 100 data, such as component obsolescence posts (including messages and comments), related hashtag data and other metadata and/or member-user data. In some embodiments, the memory area 402 is coupled to a server 406, which is in turn coupled to an administrator system 408 and/or a user (client) system 410 via a network 412. The storage devices 404 may be embodied as one or more databases, may be located at a single or at multiple geographical sites, or may be integrated with the server 406.

As can be appreciated, the network 412 can be a public network, such as the Internet, or a private network such as an LAN or WAN network, or any combination thereof and can also include PSTN or ISDN sub-networks. The network 412 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 412 is merely exemplary and in no way limits the scope of the present advancements.

As one of ordinary skill in the art would recognize, the administrator system 408 and/or the user system 410 can be a computer node such as the one described below with reference to FIG. 3, or any other computing system that is known. Moreover, it should be understood that the administrator system 408 and/or the user system 410 are configured to perform the processes described herein and/or any additional processes that may be related to those described.

The server 406 stores the computer-readable instructions to execute the processes described herein and provides these instructions via the network 412 to the administrator system 408 and/or the user system 410. Moreover, the server 406 can also provide data from the memory area 402 as needed to the administrator system 408 and the user system 410. As such, FIG. 2 includes implementations of the obsolescence Registry system 400 via cloud computing, distributed computing and the like.

Figure 3:
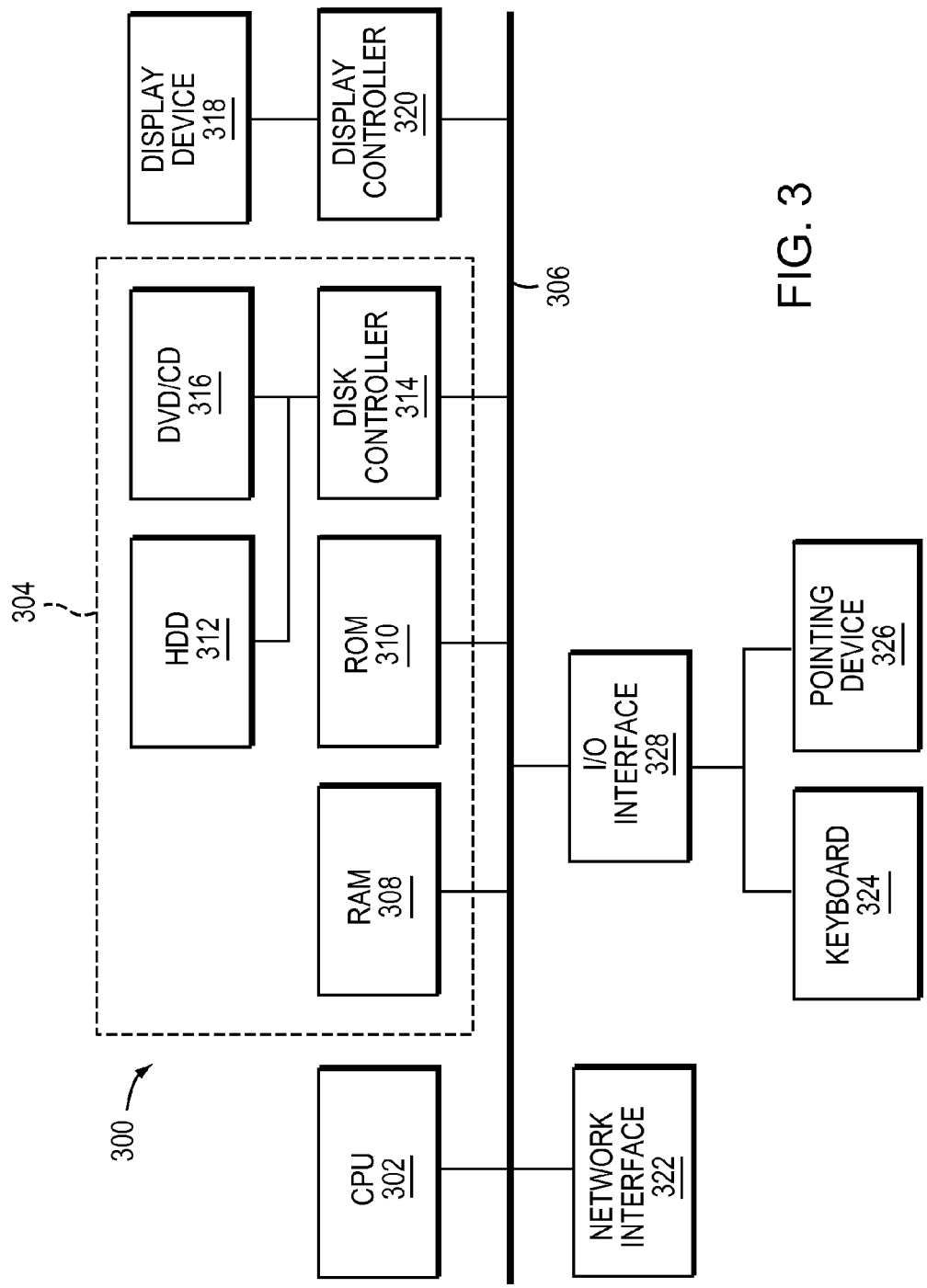
FIG. 3 is a block diagram of a computer node in the networked system of FIG. 2 embodying the present invention.

FIG. 3 is a schematic block diagram of an exemplary computer node or station 300, which may also be referred to herein as a computer system. As used herein, the terms "computer node," "computer station," and "computer system" refer generally to any suitable computing device that may be used to perform the processes described herein and/or any additional processes that may be related to those described.

In an exemplary embodiment, the computer station 300 includes one or more processors 302 (CPU) that performs the processes described herein and/or any additional processes that may be related to those described herein. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described herein and/or any additional processes that may be related to those described may be stored as computer-executable instructions in, for example, a memory area 304 that is operably and/or communicatively coupled to the processor 302 by a system bus 306. A "memory area," as used herein, refers generally to any means of storing program code and instructions executable by one or more processors to aid in automatically aligning one or more secondary objects using an alignment tool. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-erasable programmable read-only memory (EEPROM). Any other suitable magnetic, optical, and/or semiconductor memory, such as a hard-disk drive (HDD) 312, by itself or in combination with other forms of memory, may be included in the memory area 304.

HDD 312 may also be coupled to a disk controller 314 for use in transmitting and receiving messages to and from processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer station 300 also includes a display device 318 that is coupled, such as operably coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only and, thus, are not intended to limit in any way the definition and/or meaning of the term "display device."

In addition, the computer station 300 includes a network interface 322 for use in communicating with a network (shown in FIG. 2). Moreover, the computer station 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

Exemplary embodiments of systems, methods, apparatus, computer program products, and non-transitory computer-readable storage media for use in obsolescence Registry system 400 and Registry 100 are described herein in detail. The systems, methods, apparatus, computer program products, and computer-readable storage media are not limited to the specific embodiments described herein but, rather, operations of the methods, program products and/or storage media, as well as components of the system and/or apparatus, may be utilized independently and separately from other operations and/or components described herein. Further, the described operations and/or components may also be defined in, or used in combination with, other systems, methods, apparatus, program products and/or storage media, and are not limited to practice with only the systems, methods, apparatus, program products and storage media as described herein.

A computer or computer system, such as those described herein, includes at least one processor or processing unit and a system memory. The computer or computer system typically has at least some form of non-transitory computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Figure 4:
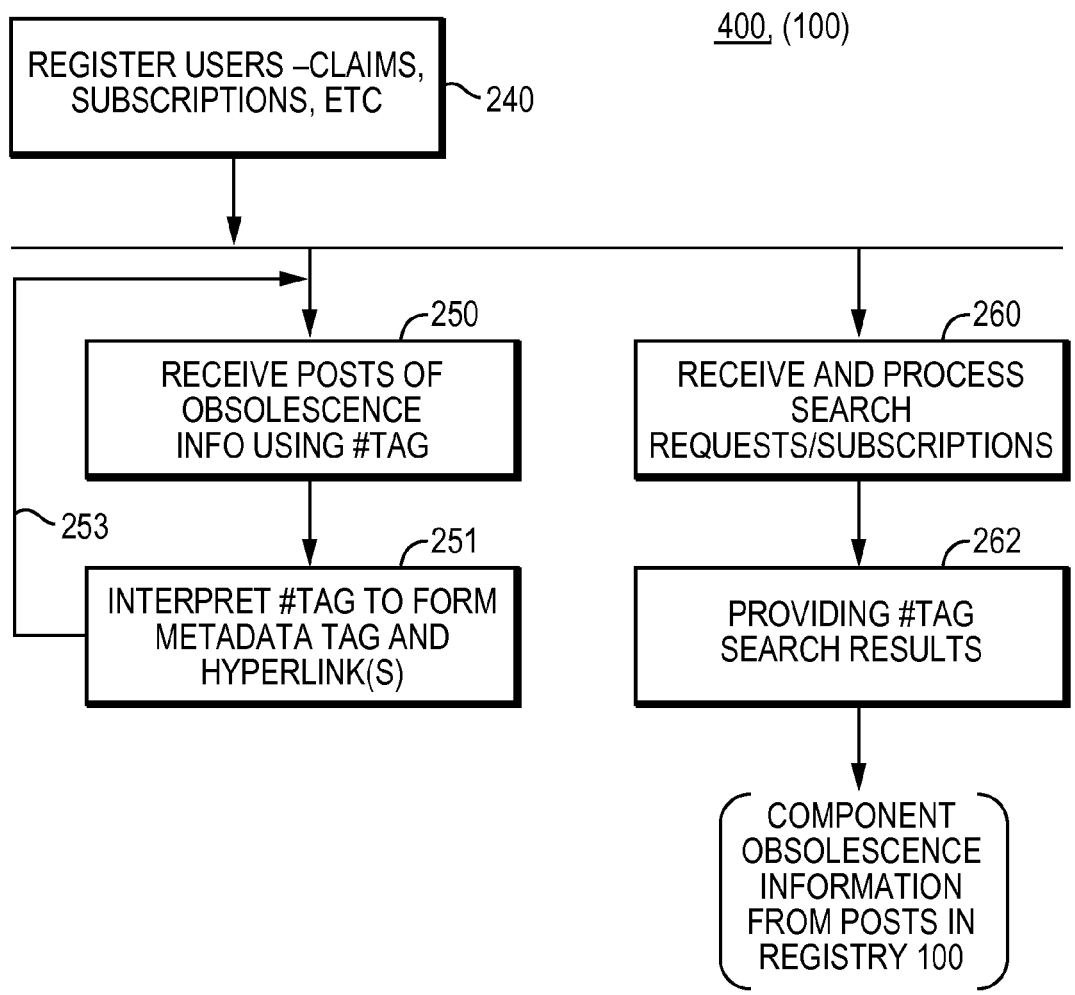
FIG. 4 is a flow diagram of the present invention.

With reference to FIG. 4 an example flow of control and data of obsolescence registry system 400 and registry 100 is provided. System 400 (at module 240) provides a user interface and enables various users to register with the site/registry 100. Module 240 may store registration information, such as user name, user type (individual, entity, etc.), claim to particular hashtag, subscription details, etc., in database 404 (shown in FIG. 2).

In due course, system 400/registry 100 receives user input at module 250 communicating component obsolescence information in the form of posts. In particular, module 250 supports a user interface that receives user messages and/or comments having respective component specific hashtags as described above. In response, for a subject message or comment, module 251 interprets the hashtag, forms a corresponding metadata tag and hyperlink, and stores the same in database 404. For each such received user message or comment, modules 250, 251 through loop 253 maintain the system registry 100 and supporting database 404. Different embodiments allow member-users and non-member-users alike, or only member-users to post component obsolescence information in registry 100.

User query input, through registry 100 user interface, is received at module 260. In particular, automated subscriptions and/or user search requests trigger module 260 to search database 404 using a requested component hashtag. Module 260 may be implemented as a search engine utilizing known search technology and common user-query-search interface. System 400 generates hashtag search results at 262 and outputs (displays) to the user the corresponding component obsolescence information from the various posts in registry 100.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well-known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of non-transitory components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method for providing component obsolescence information online in a global computer network, comprising:
    providing an electronic obsolescence registry, online in a global computer network, for holding component obsolescence information, the electronic obsolescence registry having different entries for different pieces of the component obsolescence information;
    employing component-specific indices in the different entries in the electronic obsolescence registry;
    for a respective one of the component-specific indices, authorizing a given user to maintain the respective component-specific index based on the given user's association to a certain component corresponding to the respective component-specific index;
    enabling the given user, in the global computer network, to create an entry corresponding to the respective component-specific index in the electronic obsolescence registry, while enabling end-users, in the global computer network, to create one or more entries in the electronic obsolescence registry;
    enabling the given user and end-users, in the global computer network, to search the electronic obsolescence registry for component obsolescence information relating to components using one or more component-specific indices;
    wherein global access is provided to the given user and end-users to access component obsolescence information from different sources in the electronic obsolescence registry online, such that the given user and end-users each use component-specific indices to access the electronic obsolescence registry online in the global computer network; and
    analyzing a plurality of entries having similar component-specific indices and predicting obsolescence status of the certain component corresponding to respective component-specific indices maintained by authorized given users associated to the certain component.

2. The method as claimed in claim 1 wherein providing the electronic obsolescence registry online includes providing access to the electronic obsolescence registry through a site structure of a social network site, the social network site having an associated social network, and
    the different entries are different posts by different members of the social network that is associated with the social network site.

3. The method as claimed in claim 1 wherein the different entries include messages and comments about one or more of the messages.

4. The method as claimed in claim 1 wherein the given user authorized to maintain the respective component-specific index is a certain entity with ownership association to the certain component corresponding to the respective component-specific index.

5. The method as claimed in claim 1 wherein the step of employing utilizes a component identifier in at least one of the component-specific indices.

6. The method as claimed in claim 1 wherein employing includes, for a subject component, using a part number of the subject component to form the component-specific index of the subject component.

7. The method as claimed in claim 1 further comprising:
    enabling different end-users to create the different entries in the electronic obsolescence registry.

8. The method as claimed in claim 7 further comprising enabling an end-user to subscribe to automatically receive component obsolescence information as respective entries are created in the electronic obsolescence registry.

9. A computer system providing component obsolescence information online in a global computer network, comprising:
    one or more hardware processors configured to implement:
    an electronic obsolescence registry, online in a global computer network, for holding component obsolescence information, the electronic obsolescence registry:
        having different entries for different pieces of the component obsolescence information, different entries employing different component-specific indices; and
        for a respective one of the component-specific indices, a given user being authorized to maintain the respective component-specific index based on the given user's association to a certain component corresponding to the respective component-specific index;
    an entry creation module enabling the given user, in the global computer network, to create an entry corresponding to the respective component-specific index in the electronic obsolescence registry, while enabling end-users, in the global computer network, to create one or more entries in the electronic obsolescence registry;

a search engine module enabling the given user and end-users, in the global computer network, to search the electronic obsolescence registry for component obsolescence information relating to components using one or more component-specific indices;

wherein global access is provided to the given user and end-users to access component obsolescence information from different sources in the electronic obsolescence registry online, such that the given user and end-users each use component-specific indices to access the electronic obsolescence registry online in the global computer network; and the search engine module further analyzing a plurality of entries having similar component-specific indices and predicting obsolescence status of the certain component corresponding to respective component-specific indices maintained by authorized given users associated to the certain component.

10. The computer system as claimed in claim 9 wherein the electronic obsolescence registry is online and configured for a site structure of a social network site, the social network site having an associated social network, and
the different entries are different posts by different members of the social network that is associated with the social network site.

11. The computer system as claimed in claim 9 wherein the different entries include messages and comments about one or more of the messages.

12. The computer system as claimed in claim 9 wherein the given user authorized to maintain the respective component-specific index is a certain entity with ownership association to the certain component corresponding to the respective component-specific index.

13. The computer system as claimed in claim 9 wherein the electronic obsolescence registry utilizes a component identifier in at least one of the component-specific indices.

14. The computer system as claimed in claim 9 wherein, for a subject component, the electronic obsolescence registry uses a part number of the subject component to form the component-specific index of the subject component.

15. The computer system as claimed in claim 9 further comprising:
a first user interface to the electronic obsolescence registry enabling different end-users to create the different entries in the registry.

16. The computer system as claimed in claim 15 further comprising a second user interface to the electronic obsolescence registry enabling an end-user to subscribe to automatically receive component obsolescence information as respective entries are created in the electronic obsolescence registry.

17. The computer system as claimed in claim 9 wherein the component-specific indices are hashtags.

18. A computer program product comprising:
a non-transitory computer readable storage medium having thereon a computer program and computer program code embodied on the non-transitory computer-readable storage medium supporting execution of the computer program by a processor and causing the processor to:

provide, online in a global computer network, an electronic obsolescence registry for holding component obsolescence information, the electronic obsolescence registry having different entries for different pieces of the component obsolescence information;

employ component specific indices in the different entries in the electronic obsolescence registry;

for a respective one of the component-specific indices, authorize a given user to maintain the respective component-specific index based on the given user's association to a certain component corresponding to the respective component-specific index;

enable the given user, in the global computer network, to create an entry corresponding to the respective component-specific index in the electronic obsolescence registry using a component-specific index, while enabling end-users, in the global computer network, to create one or more entries in the electronic obsolescence registry; and enable the given user and end-users, in the global computer network, to search the electronic obsolescence registry for component obsolescence information relating to components using one or more component-specific indices;

wherein global access is provided to the given user and end-users to access component obsolescence information from different sources in the electronic obsolescence registry online, such that the given user and end-users each use component-specific indices to access the electronic obsolescence registry online in the global computer network; and analyze a plurality of entries having similar component-specific indices and predict obsolescence status of the certain component corresponding to respective component-specific indices maintained by authorized given users associated to the certain component.

* * * * *